US00RE37904E

(19) United States
(12) Reissued Patent
Lee

(10) Patent Number: US RE37,904 E
(45) Date of Reissued Patent: Nov. 12, 2002

(54) APPARATUS IN DIGITAL VIDEO TAPE RECORDER FOR DETECTING A SYNC SIGNAL IN DIGITAL DATA

(75) Inventor: Doo Hee Lee, Kyungki-do (KR)

(73) Assignee: LG.Philips LCD Co., Ltd., Seoul (KR)

(21) Appl. No.: 09/340,732

(22) Filed: Jun. 28, 1999

Related U.S. Patent Documents

Reissue of:
(64) Patent No.: 5,696,867
Issued: Dec. 9, 1997
Appl. No.: 08/605,891
Filed: Feb. 23, 1996

(30) Foreign Application Priority Data

Feb. 23, 1995 (KR) ..... 3553/1995

(51) Int. Cl.[7] ..... H04N 5/04
(52) U.S. Cl. ..... 386/46; 386/84; 386/124; 348/500; 360/51
(58) Field of Search ..... 386/46, 84, 12, 386/68, 66, 71, 124, 40, 45, 1, 125–126; 360/39, 51, 48, 32; 369/47–50, 54, 58, 59, 60.01, 124, 116; 348/500, 501, 521; H04N 5/76, 5/04, 5/92, 9/79

(56) References Cited

U.S. PATENT DOCUMENTS 4,275,466 A * 6/1981 Yamamoto ..... 375/113
4,862,443 A * 8/1989 Tsuji et al. ..... 369/59
4,879,731 A * 11/1989 Brush ..... 375/116
5,223,991 A * 6/1993 Nagai et al. ..... 386/68
5,327,300 A * 7/1994 Satomura ..... 360/51
5,446,715 A * 8/1995 Satomura ..... 369/49
5,523,856 A * 6/1996 Kawano et al. ..... 386/84
5,661,708 A * 8/1997 Yamawaki ..... 369/59
5,696,745 A * 12/1997 Yamawaki ..... 369/57
5,796,690 A * 8/1998 Kanno ..... 369/48
6,061,311 A * 5/2000 Asano et al. ..... 369/47

* cited by examiner

*Primary Examiner*—Thai Tran
(74) *Attorney, Agent, or Firm*—Long Aldridge & Norman LLP

(57) ABSTRACT

An apparatus for a digital video tape recorder for detecting a sync signal in digital data includes: a data restoring device for producing serial data and a serial clock signal received from a reproducing head of the digital video tape device; a servo device for producing a head switching pulse and a super-video home system (S-VHS)/video home system (VHS) discriminating signal; an identification detecting device for producing a signal indicative of an end of reading one segment of tracks; and a sync signal detecting device, responsive to each signal produced by the aforementioned devices, for determining correspondence in sync patterns even in a case where not all corresponding bits coincide with one another, for removing erroneously detected sync patterns using a window situated around a position at which a sync signal is produced, and for detecting a sync signal.

30 Claims, 10 Drawing Sheets

APPARATUS IN DIGITAL VIDEO TAPE RECORDER FOR DETECTING A SYNC SIGNAL IN DIGITAL DATA

Matter enclosed in heavy brackets [ ] appears in the original patent but forms no part of this reissue specification; matter printed in italics indicates the additions made by reissue.

BACKGROUND OF THE INVENTION

The present invention relates to an apparatus in a digital video tape recorder (DVTR) for detecting a sync signal in digital data. More particularly, the present invention relates to an apparatus for the detection of a sync signal in serial data which has been reconstituted from parallel data. Such an apparatus facilitates recovery from the slip-off of synchronization of bits, and enables the detection of sync patterns with less circuitry than that of a sync detection system operating at a parallel data rate.

U.S. Pat. No. 4,275,466 discloses a sync detection scheme in which circuitry operates at a serial clock rate. Meanwhile, U.S. Pat. No. 4,879,731 discloses a system for detecting a sync signal in parallel data converted from serial data.

FIG. 1 is a block diagram of conventional sync detection circuitry operating at a serial data rate. FIG. 2 is a waveform diagram for explaining the operation of the system shown in FIG. 1. FIG. 3 is a block diagram of another conventional sync detection system operating at a parallel data rate.

Referring to FIG. 1, data signal $S_D$ is applied to a predetermined sync pattern matching means 15 operative to detect when a bit pattern in a shift register corresponds to a predetermined sync bit pattern that is supposed to be recorded once in each of the successive blocks of N bits recorded on a recording medium. The sync pattern matching means 15 generates a detected sync signal Si whenever such a correspondence is detected. A pulse signal PG indicates the reading of a track has begun, and a signal SM is a search-mode setting signal. The signal SM attains a high level upon receipt of the signal PG, and then attains a low level once the signal Si is generated to thereby search an initial sync signal Sync.

The sync signal Sync serves as a clear signal to a counter 22 so that the counter 22 is cleared by an output of an OR gate 18 each time a sync signal is generated. Once cleared, the counter 22 continues counting reference pulses $P_R$. The counter 22 repeatedly counts the output of the OR gate 18 from 0 to N−1 in response to the pulses of reference pulse signal $P_R$, and an AND gate 23 supplied a counted sync signal S1. That is to say, the counter 22 counts the output of the OR gate 18 to produce a sync signal, and when the count of N counter 22 attains a value of N−1, the AND gate 23 supplies a counted sync signal S1. CM indicates a check mode signal. The CM signal becomes a high signal when the detected sync signal Si does not correspond to the counted sync signal S1, and attains a low level every time an output Sc of a comparator 35 is produced. When all the signals Si, CM and Sc attain a high level, they are recognized as sync signals.

This system requires proper re-alignment of the data for the recovery from the slip-off synchronization of bits, but only performs the delay propagation of serial data. This gives rise to a disadvantageous problem in subsequent data processing.

FIG. 3 is a block diagram of a sync detection system performed at a parallel data rate. This system includes a converting means 51 that receives serial digital data and a serial clock signal from a reproducing head of a digital tape recorder. The converting means 51 converts this data into a parallel form, and generates a parallel clock signal that is provided to other parts of the circuit.

It is assumed that a sync pattern of this type may have any one of eight different positions or alignments in the parallel data stream. A detecting means 52 detects the sync pattern in one of these eight alignments. Whenever a sync pattern is detected, the detecting means 52 produces a sync signal and a position signal indicating the particular alignment detected. A comparing means 52 calculates the difference between the situation where a sync pattern is detected and where it is expected on the basis of the previous sync pattern. This system is different from the one operating at a serial data rate in comparing the actual position with an expected position indicated by an expected position signal. This parallel-data sync detection needs N comparators (not illustrated) in the comparing means 53 in the situation where M−N modulation-demodulation is being performed, and when a detected sync signal is generated from one of the N comparators, re-aligned data and a final sync signal are produced by means of an encoder (not illustrated) and a decoder (not illustrated).

When a sync slip occurs before and after a position at which a sync signal is detected, by using a first signal generating means 54 and a third signal generating means 56, a SYNC-IN-WINDOW signal is moved forward and backward. The decoder of the comparing means 53, the first signal generating means 54, and the third signal generating means 56 should employ N multiplexers, an adder (not shown), and a memory (not shown), respectively, which results in a complicated circuitry arrangement.

In the sync detection circuit operating at a parallel data rate, the sync patterns in a data bit stream that are recorded in serial form become an important factor, and may be impaired by damage to a tape, degradation of signals, or errors in the rotational speed of drums, all of which make sync detection difficult. Besides, there may occur errors in data patterns, as well as a lack of coincidence between clock signals of sync patterns. The serial-data sync detection has a problem in that synchronization errors adversely affect the correction of sync slip in bit positions.

The sync detection system performing at a parallel data rate has a first step for converting the incoming serial data to parallel data without regard to proper alignment. Sync detection is then performed upon the parallel data at the parallel data rate, and the parallel data is shifted into its original alignment, using the position of the detected sync patterns as a guide. Such a sync detection scheme reduces the need for high speed logic and facilitates correction for the slip-off of the synchronization of bits. This scheme, however, is difficult to carry out in large scale integration.

SUMMARY OF THE INVENTION

There is a need for an apparatus in a digital video tape recorder according to which sync detection and data alignment may be performed at a serial clock rate, thus correcting synchronization errors using a predetermined window situated around the expected position of the sync signal, and providing a proper response to the displacement or absence of sync signals, while at the same time, reducing circuitry as compared to that of the sync detection system operating at a parallel data rate.

With this in mind, the present invention relates to an apparatus in a digital video tape recorder for detecting a sync signal in digital data, comprising: data restoring means for producing serial data and a serial clock signal received from a reproducing head of the digital video tape recorder; servo means for producing a head switching pulse and a super-video home system (S-VHS)/video home system (VHS) discriminating signal; identification detecting means for producing a signal indicative of an end of reading one segment of tracks; and sync signal detecting means, responsive to each signal produced by the aforementioned means, for determining correspondence in sync patterns even in a case where not all corresponding bits coincide with one another, for removing erroneously detected sync patterns using a window situated around a position at which a sync signal is produced, and for detecting a sync signal.

DETAILED DESCRIPTION OF PREFERRED EMBODIMENTS

A preferred embodiment of the present invention will now be described in detail with reference to the accompanying drawings.

Figure 1:
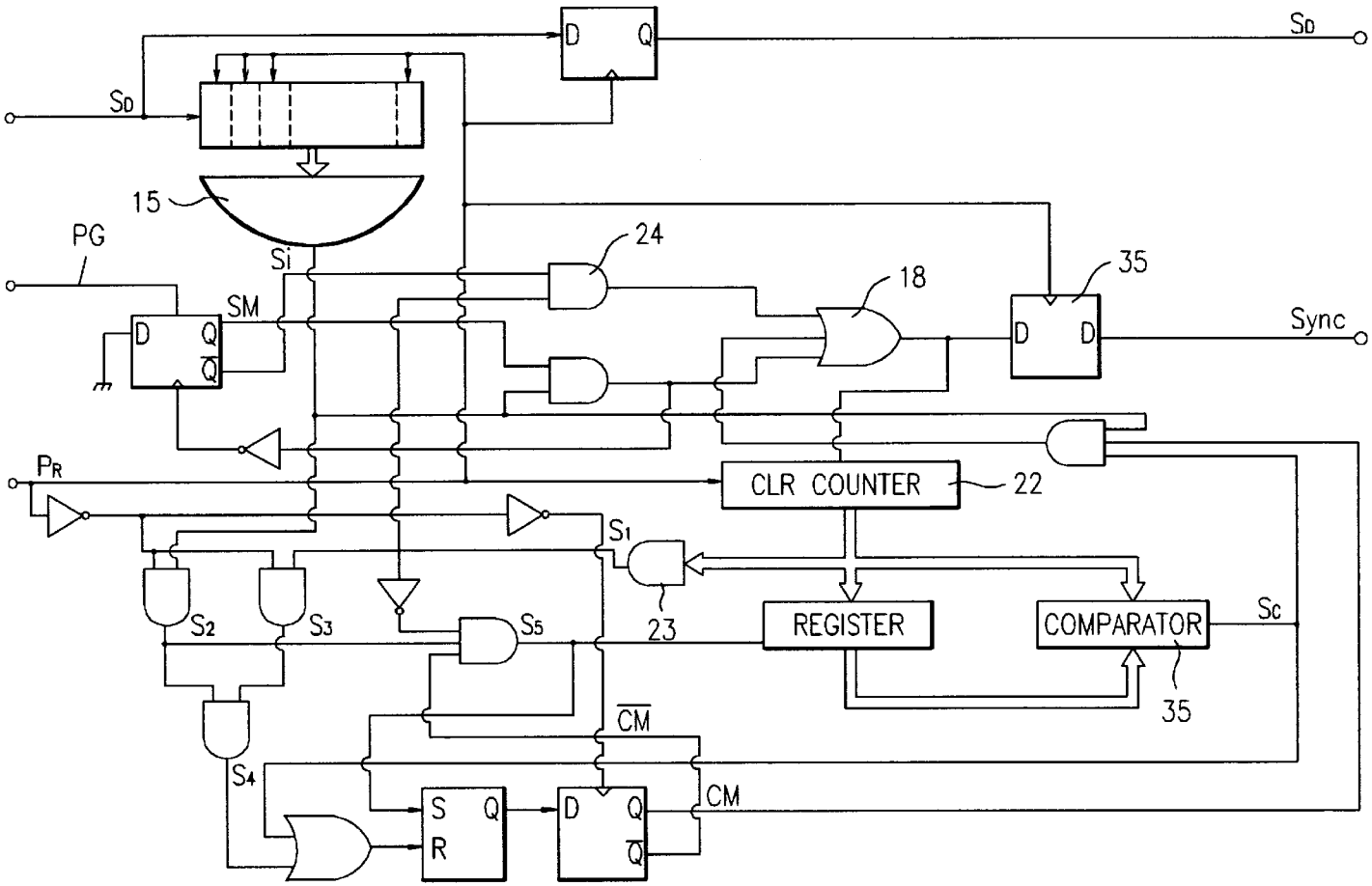
F I G.1 prior art
FIG. 1 is a block diagram of conventional sync detection system operating at a serial data rate.
Figure 2:
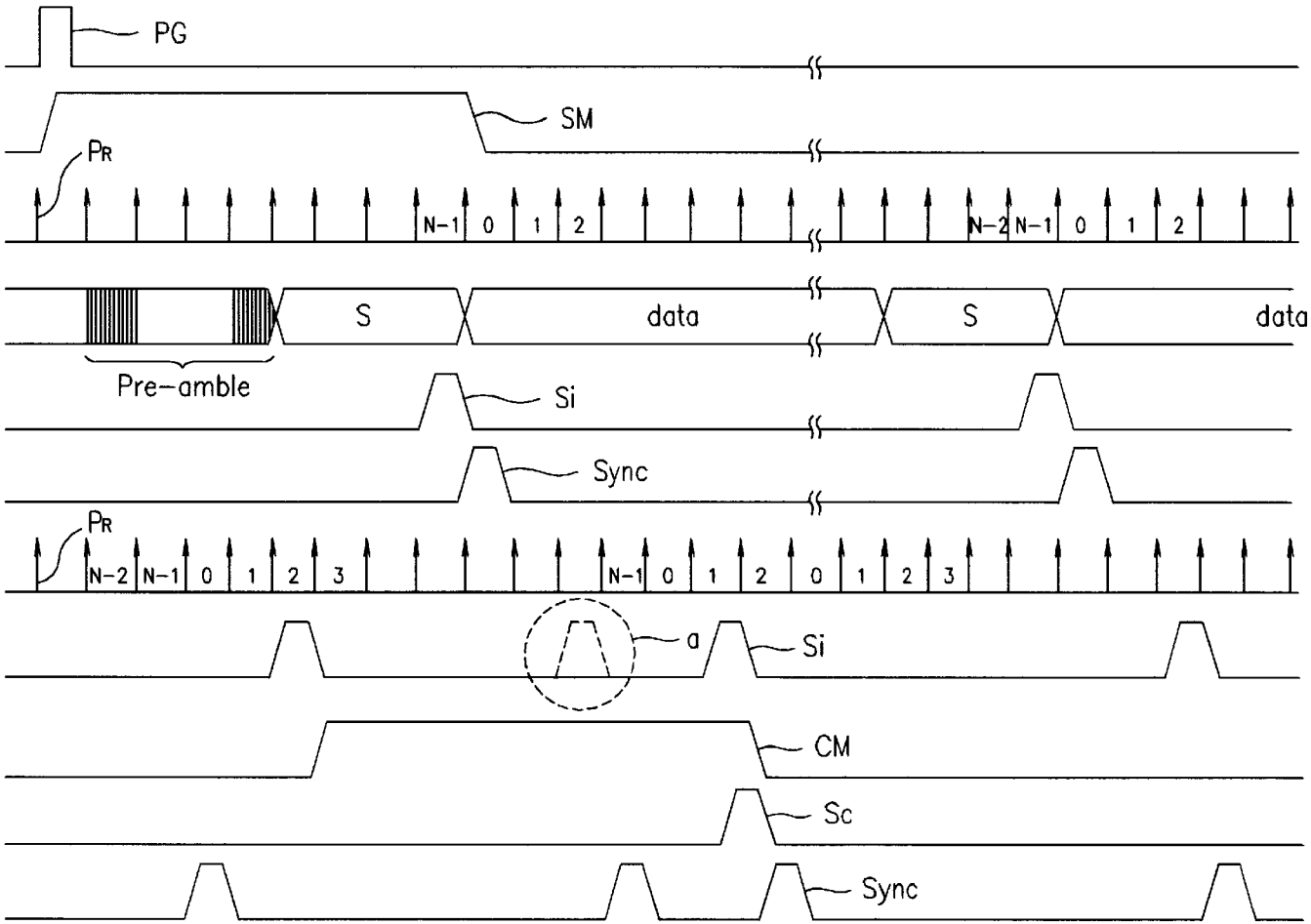
FIG.2 prior art
FIG. 2 is a waveform diagram for explaining the operation of the system shown in FIG. 1.
Figure 3:
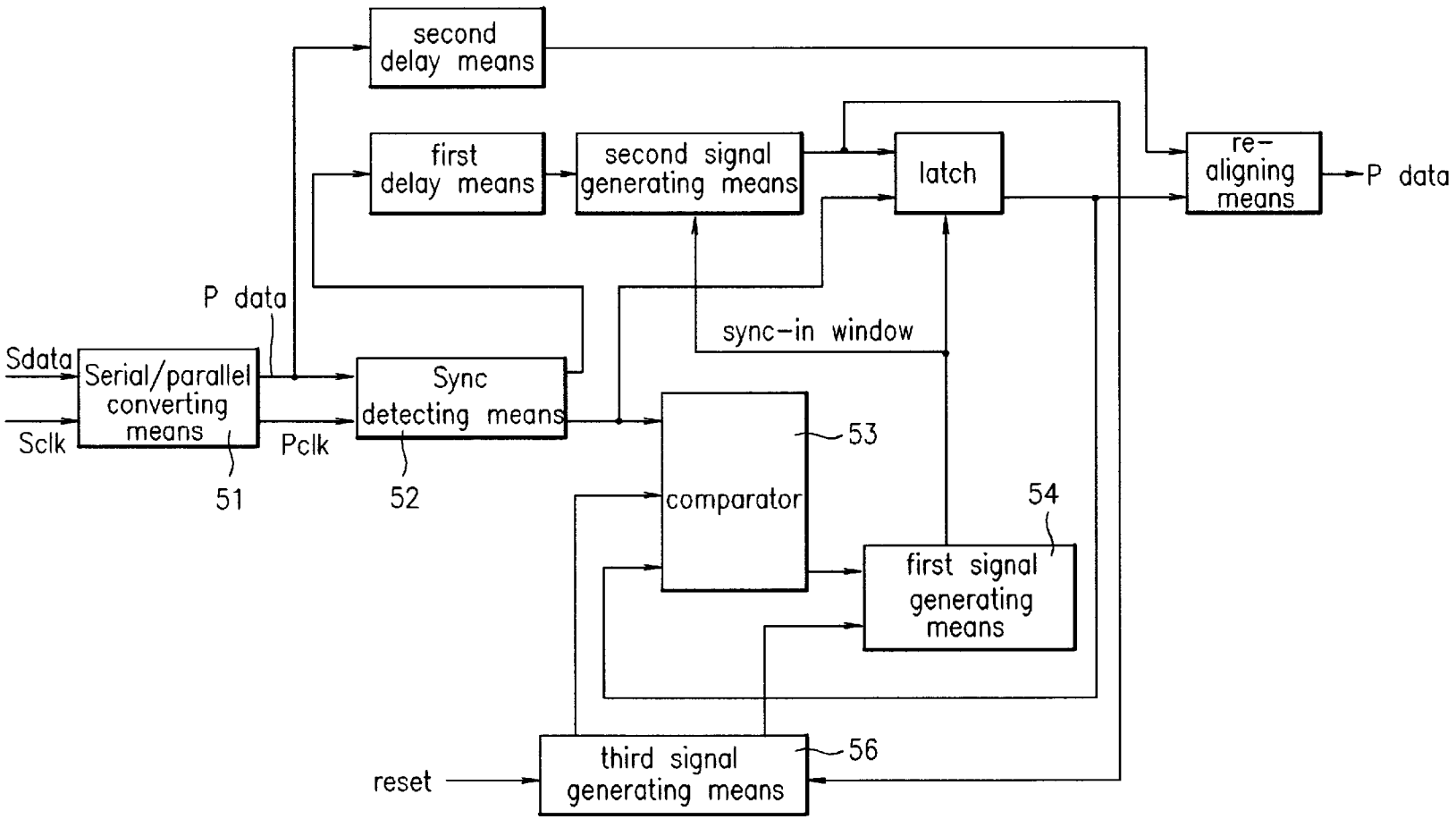
F I G.3 prior art
FIG. 3 is a block diagram of a conventional sync-detection system operating at a parallel data rate.
Figure 4:
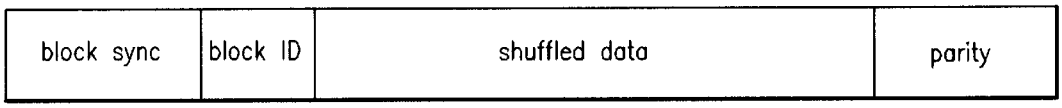
F I G.4 prior art
FIG. 4 depicts a sync block in one general segment.

Prior to discussing the present invention, a data format recorded on a tape and a sync clock will be described. In this regard, FIG. 4 shows a sync block in one segment that includes a block sync pattern of 2 sync bytes, a block ID (identification) of 1 sync byte, shuffled data of 104 sync bytes, and parity of 8 sync bytes.

Figure 5A:
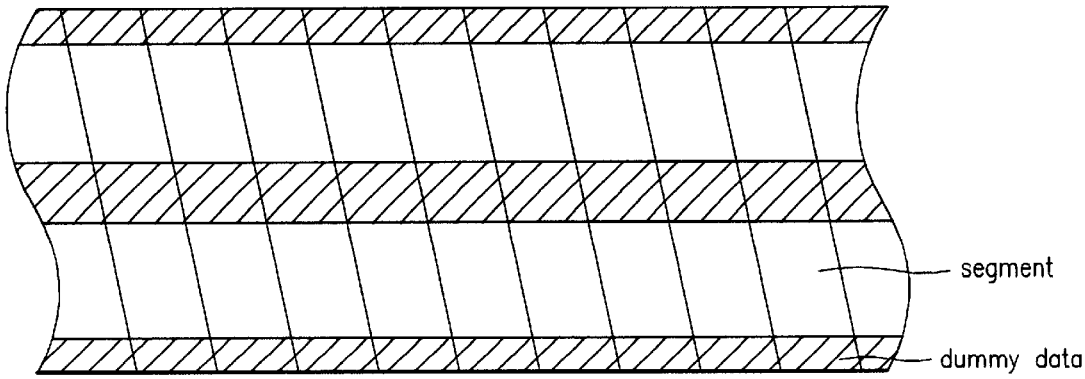
F I G.5A prior art
FIGS. 5A and 5B are data formats that are recorded on a tape of a super-video home system (S-VHS) and on a tape of a video home system (VHS), respectively.
Figure 5B:
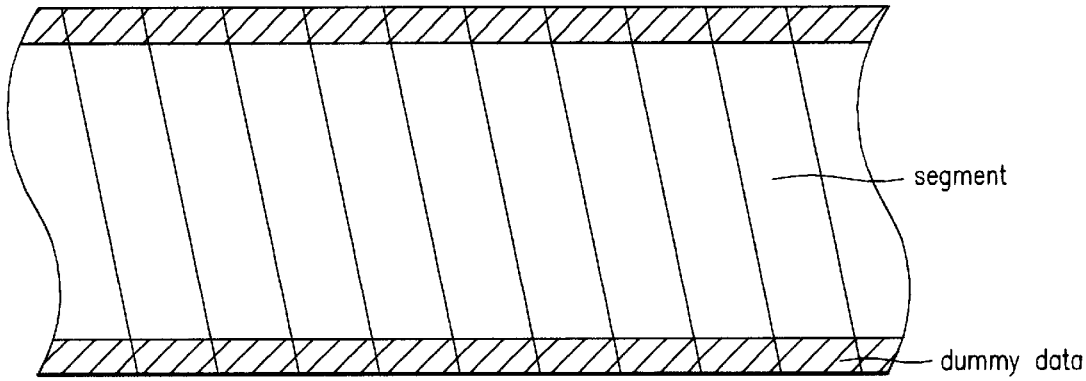
F I G.5B prior art

FIG. 5A is a data format recorded on an S-VHS tape and FIG. 5B is a data format recorded on a VHS tape. The lined part therein is indicative of a dummy data recording region and the other part therein indicates an effective data recording region.

Figure 6:
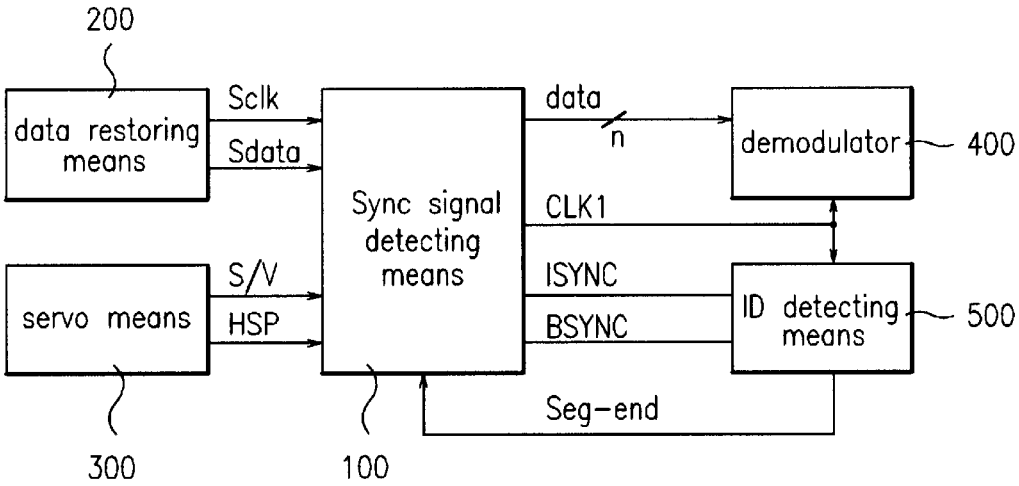
FIG. 6 is a block diagram of a preferred embodiment of the present invention.

FIG. 6 is a block diagram of a preferred embodiment of the present invention having a data restoring means 200 that restores data and a clock recorded on a tape and that transfers them to a sync signal detecting means 100, a servo means 300 that transmits a head switching pulse HSP each time a track is changed and an S-VHS/VHS discriminating signal S/V for discriminating S-VHS from VHS, and a demodulating means 400 that retrieves original signals from the data recorded on the tape produced from the sync signal detecting means 100.

The sync detection system also includes an identification (ID) detecting means 500 that transmits a segment-end signal Seg-end to indicate that one segment of a given track is finished. The sync signal detecting means 100 produces n-bit data, a first clock signal clk1, a signal Isync indicating the reading of an initial portion of a given track, and a block sync signal Bsync, in response to a sync pattern, on the basis of the above signals.

Figure 7:
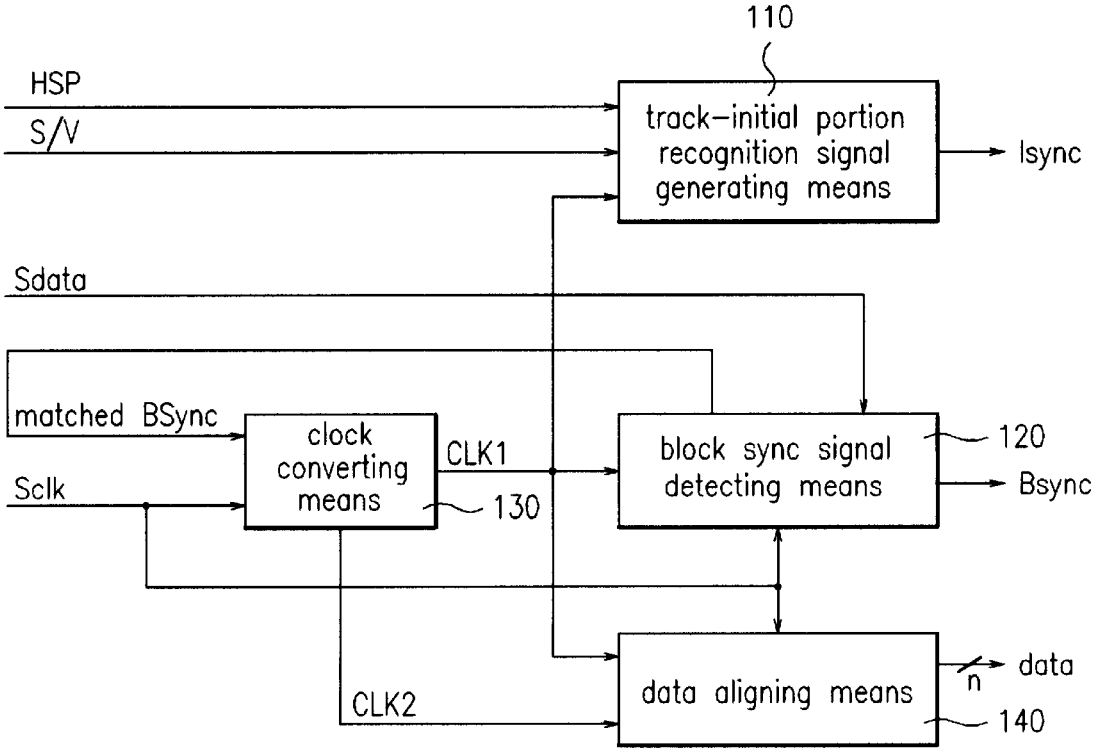
FIG. 7 is a preferred implementation of the sync signal detecting means of FIG. 6.

FIG. 7 is a preferred implementation of the sync signal detecting means 100. Preferably, the sync signal detecting means 100 includes a track-initial portion recognition signal generating means 110, a block sync signal detecting means 120, a clock converting means 130 producing first and second clock signals clk1 and clk2, respectively, and a data aligning means 140 that produces final data in response to the sync pattern. The track-initial portion recognition signal generating means 110 produces the signal Isync that is indicative of the reading of an initial portion of a given track, by using the head switching pulse HSP and S/V signal from the servo means 300 and the first clock signal clk1 from the clock converting means 130.

The block sync signal detecting means 120 produces a final block sync signal Bsync by using the serial data Sdata and the serial clock signal Sclk from the data restoring means 200, and the first clock signal clk1 from the clock converting means 130. The clock converting means 130 produces first and second clock signals clk1 and clk2 in response to the serial clock signal Sclk and a matched block sync signal Bsync matched in a window in response to a predefined sync pattern.

Figure 8:
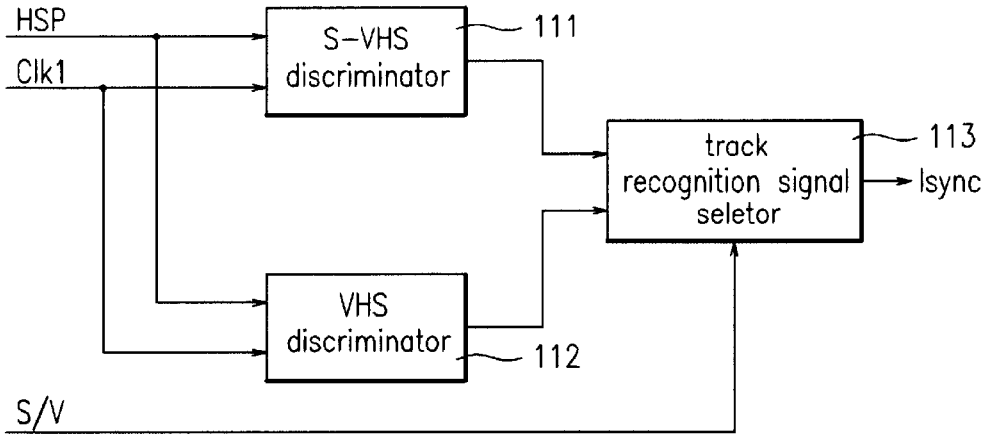
FIG. 8 is a preferred implementation of the track-initial portion recognition signal generating means of FIG. 7.

The data aligning means 140 produces final data in response to the sync pattern by using the first and second clock signals clk1 and clk2 from the clock converting means 130 and the serial clock signal Sclk from the data restoring means 200. The track-initial portion recognition signal generating means 110 includes an S-VHS discriminator 111, a VHS discriminator 112, and a track recognition signal selector or track-initial portion recognition signal selector 113, as shown in FIG. 8. Through these means, a signal Isync indicating the reading of the initial portion of a given track in a S-VHS tape and a signal Isync indicating the reading of the initial portion of a given track in a VHS tape, are detected. In the case where the S-VHS/VHS discriminating signal S/V produced from the servo means 300 attains a high level or a low level, S-VHS or VHS are selected, respectively.

The S-VHS discriminator 111 produces the Isync signal indicative of reading the initial portion of every given track in an S-VHS tape by using the head switching pulse HSP and first clock signal clk1, and generates the Isync signal indicative of reading the initial portion of a given track every two tracks. The track recognition signal selector 113 selects an output of the S-VHS discriminator 111 in the case where the S-VHS/VHS discriminating signal S/V attains a high level, and selects an output of the VHS discriminator 112 in the case where the incoming S-VHS/VHS discriminating signal S/V attains a low level.

Figure 9:
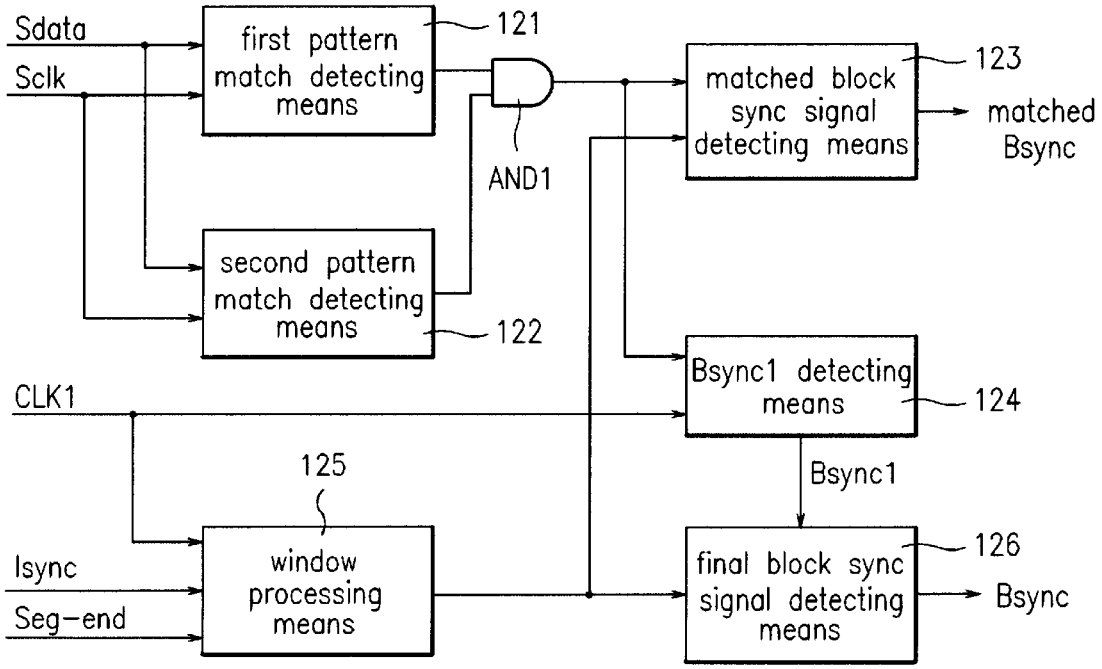
FIG. 9 is a preferred implementation of the block sync signal detecting means of FIG. 7.

FIG. 9 shows components of the block sync signal detecting means 120. With reference to FIG. 9, the block sync signal detecting means 120 includes first and second pattern match detecting means 121 and 122, and AND gate AND1, a matched block sync signal detecting means 123, a BSYNC1 detecting means 124, a window processing means 125, and a final block sync signal detecting means 126.

The block sync signal detecting means 120 produces a final block sync signal Bsync. The block sync signal detecting means 120 matches and detects a block sync signal at a serial data rate, and recognizes the block sync signal if it occurs within a predetermined window around the expected position of the sync signal. The block sync signal detecting means 120 converts the serially-matched block sync signal into a block sync signal having a width of the first clock signal clk1, and produces a final block sync signal Bsync by means of a window.

The first and second pattern match detecting means 121 and 122 each receive the serial data and serial clock signal Sclk, and MSB 6 bits of the data are detected from each expected position of them. Other bits than MSB 6 bits are detected to a maximum of 4 bits, even if errors occur. The AND gate AND1 receives outputs generated from the first and second pattern match detecting means 121 and 122. The matched block sync signal detecting means 123 processes an output of the AND gate AND1 with a predetermined window to generate a matched block sync signal, namely, matched Bsync, that may be used as a clear signal of the second clock signal clk2.

The BSYNC1 detecting means 124 converts the output of the AND gate AND1 into the block sync signal BSYNC1 having the width of the first clock signal clk1, and processes it with a predetermined window so that the output signal therefrom may be recognized as a final block sync signal Bsync. The window processing means 125 receives the Isync signal, the Seg-end signal from the ID detecting means 500, and the first clock clk1 to define a window so that the final block sync signal detecting means 126 removes block sync signals erroneously detected in the AND gate AND1.

Figure 10:
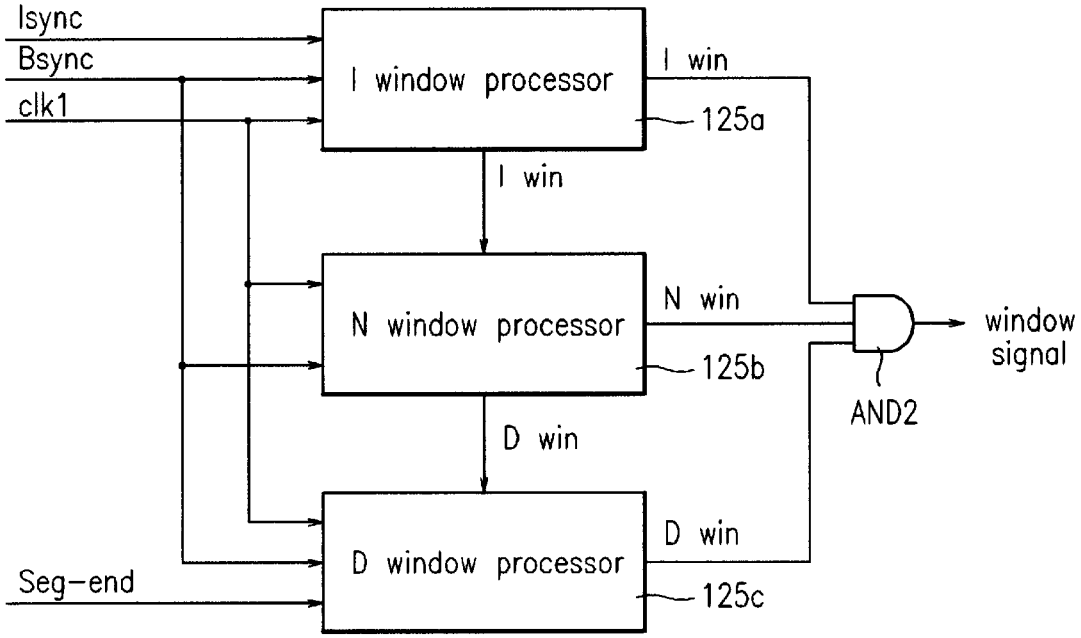
FIG. 10 is a preferred implementation of the window processing means of FIG. 9.

As shown in FIG. 10, the window processing means 125 includes an I window processor 125a, and N window processor 125b, a D window processor 125c, and an AND gate AND2. The I window processor 125a generates an I window signal Iwin for detecting an initial block sync signal in a given track in response to the Isync signal, the output signal Bsync1 of the BSYNC1 detecting means 124, and the first clock signal clk1. Receipt of the Isync signal and the Bsync signal determines a "window open" state and a "window closed" state, respectively.

The N window processor 125b generates an N window signal Nwin for making the window open state or the window closed state in response to a counted value of the signals, by using as a clear signal the block sync signal Bsync1, the first clock signal clk1, and the output signal Iwin of the I window processor 125a. The size of the N window is set by a control signal of error correct means for correcting errors at a signal-finally outputting terminal. The D window processor 125c produces a D window signal Dwin that makes the window open for a predetermined block duration upon receipt of the Seg-end signal from the detecting means 500, and defines the window closed state upon receipt of the block sync signal Bsync. The AND gate AND2 outputs as a final window signal a logical product of the outputs of I, N, and D window processors 125a to 125c.

Figure 11:
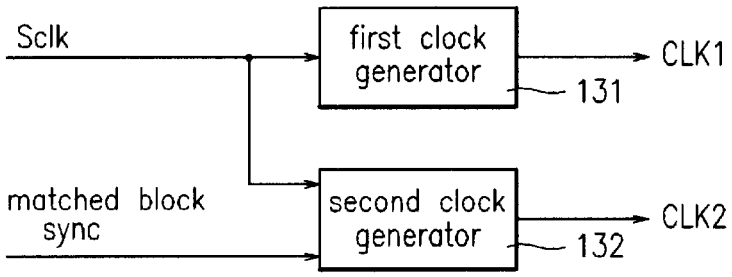
FIG. 11 is a preferred implementation of the clock converting means of FIG. 7.

As seen from FIG. 11, the block converting means 130 has a first clock generator 131 and a second clock generator 132. The first clock generator 131 constitutes a first clock signal clk1 having a duty cycle of 50% by using the serial clock signal Sclk, and the second clock generator 132 produces a second clock signal having a different duty cycle every time the block sync signal Bsync is applied, by using as a clear signal the matched block sync signal from the matched block sync signal detecting means 123 with the window.

Figure 12:
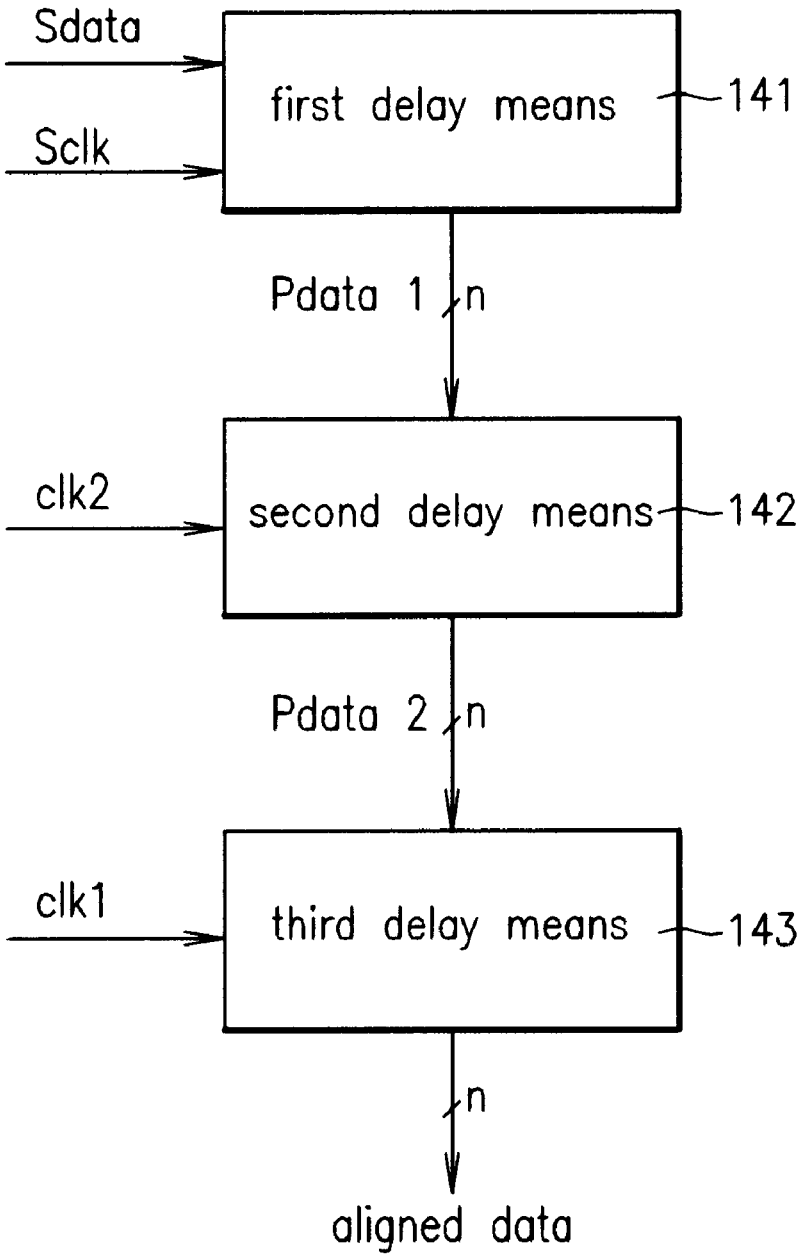
FIG. 12 is a preferred implementation of the data aligning means of FIG. 7.

Referring to FIG. 12, the data aligning means 140 is composed of first, second, and third delay means 141, 142, and 143, respectively. The data aligning means 140 delays data three times to achieve data alignment. In the case of performing M-N modulation-demodulation, the first delay means 141 delays the serial data Sdata from the data restoring means 200 with the serial clock Sclk N times, and produces parallel data Pdata1. The second delay means 142 receives the parallel data from the first delay means 141 and delays it with the second clock signal clk2 by using the detected block sync signal Bsync as a clear signal. Finally, the third delay means 143 latches the parallel data Pdata2 with the first clock clk1 having a duty cycle of 50% such that n-bit data is produced to the demodulator 400 to be retrieved as m-bit data.

Figure 13:
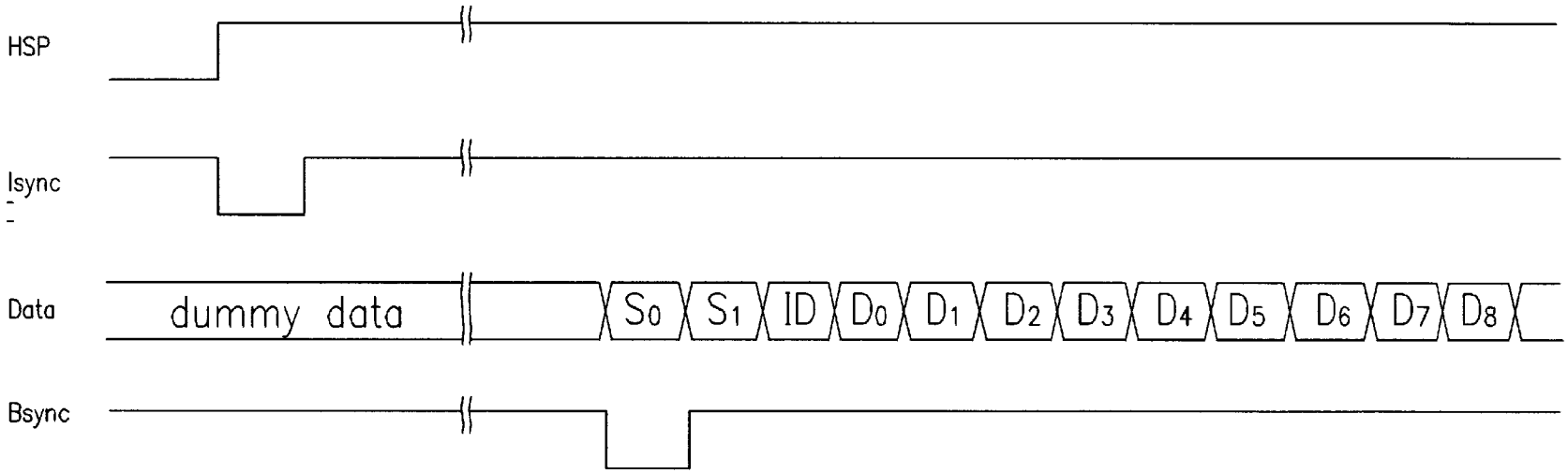
FIG. 13 is a timing diagram showing the relation of track-initial portion recognition signal, block sync signal and aligned data.

FIG. 13 is a timing diagram showing the relation of the Isync signal, the Bsync signal, and the aligned data produced or the head switching pulse HSP basis. The Bsync signal is produced in response to the sync pattern So at the beginning of the data blocks.

Figures 14A, 14B, 14C, 14D, 14E, 14F, 14G, 14H:
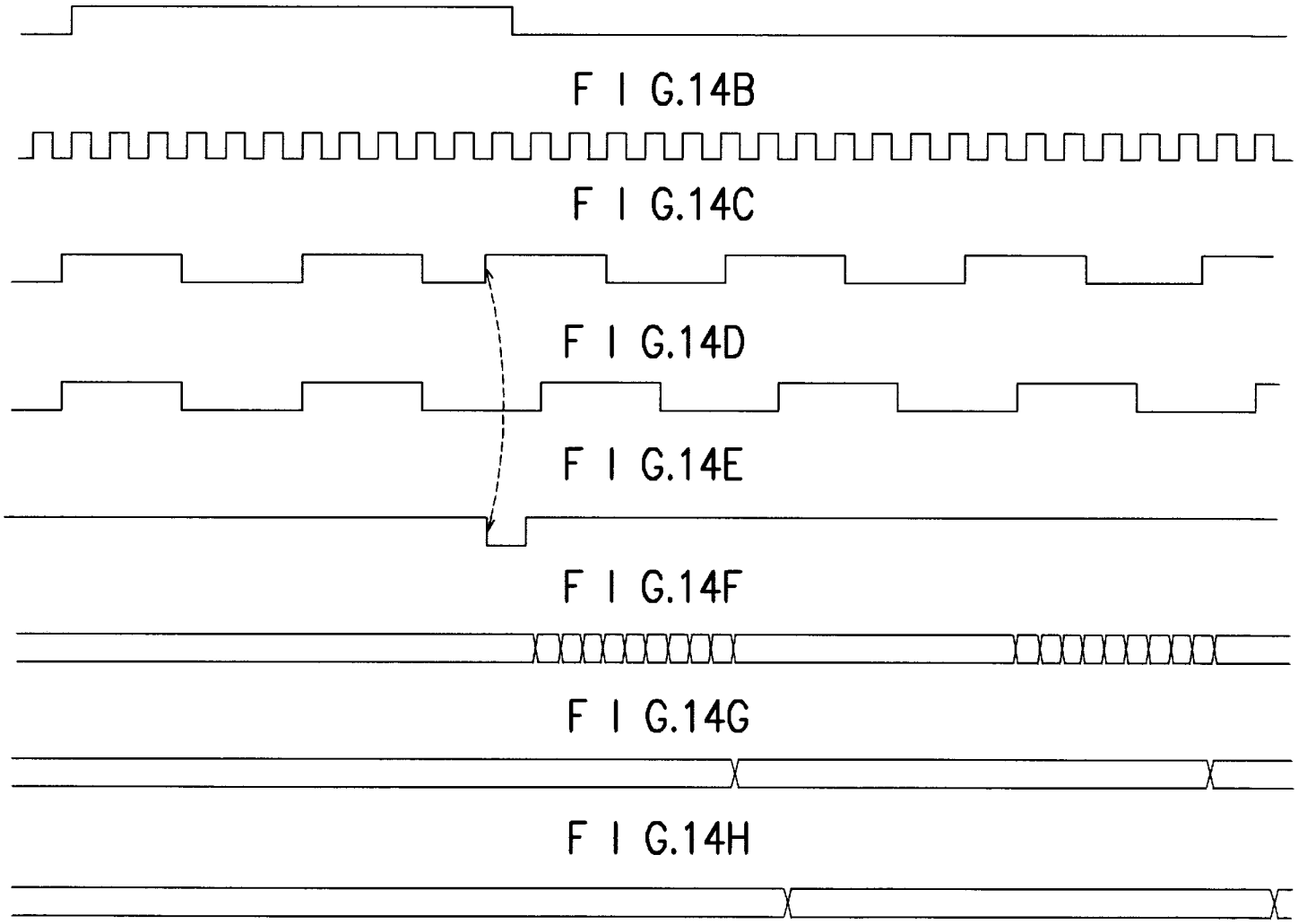
FIGS. 14A through 14H are waveform diagrams of various signals relating to the present invention.

FIGS. 14A to 14H are waveform diagrams of signals of the present invention. FIG. 14A shows the serial data Sdata including sync patterns (high level), and FIG. 14B depicts the serial clock signal Sclk. FIG. 14C depicts the second clock signal clk2 having a width varying with the generation of the signal of FIG. 14E. FIGS. 14D and 14E depict the first clock signal clk1 having a constant duty cycle and the matched block sync signal matched to the sync pattern. FIG. 14F shows parallel data latched by the serial clock signal Sclk and FIG. 14F shows parallel data produced by latching the data of FIG. 14F by the second clock clk2 of FIG. 14C. 14H depicts final parallel data produced by latching the parallel data of FIG. 14G by the first clock clk1 of FIG. 14D.

The first and second clock signals clk1 and clk2 are produced in the same form before the matched block sync signal is produced and, after application of the matched block sync signal, the duty cycle of the second clock signal slk2 is changed to be moved up at the position of the matched block sync signal. The second clock signal clk2 has a duty cycle of 50% until the block sync signal is applied.

Accordingly, the data is delayed N times to be shifted to a serial clock signal at the point when the data has a different duty cycle from the original one. At this point, data alignment is achieved. After the application of the matched block sync signal, the first and second clock signals clk1 and clk2 have the same duty cycle but have different rising and falling edges from one another. The data that was latched by the second clock signal clk2 is latched by the first clock signal clk1 in the middle portion to thereby stabilize the production of the data.

The present invention provides an apparatus for a digital video tape recorder in which sync detection and data alignment may be performed at a serial clock rate, thus correcting synchronization errors with a predetermined window around the expected position of the sync signal, and providing a proper response to the displacement or absence of sync signals, while at the same time, reducing the amount of required circuitry as compared to that of the sync detection system operating at a parallel data rate.

The subject invention has been described above in terms of several specific embodiments. It will be understood, however, that these embodiments have been used merely to illustrate the principles of the invention, and it is possible that the principles of the invention could be implemented in embodiments other than those specifically described above.

What is claimed is:

1. An apparatus for a digital video tape device for detecting a sync signal in digital data, comprising:

data restoring means for producing serial data and a serial clock signal received from a reproducing head of the digital video tape device;

servo means for producing a head switching pulse and a super-video home system (S-VHS)/video home system (VHS) discriminating signal;

identification detecting means for producing a signal indicative of an end of reading one segment of tracks; and sync signal detecting means, responsive to the serial data, the serial clock signal, the head switching pulse, the S-VHS/VHS discriminating signal, and the signal indicative of the end of the reading of one segment of tracks, for determining correspondence in sync patterns even in a case where not all corresponding bits coincide with one another, for removing erroneously detected sync patterns using a window situated around a position at which a sync signal is produced, and for detecting a sync signal.

2. An apparatus for a digital video tape device for detecting a sync signal in digital data, comprising:

data restoring means for producing serial data and a serial clock signal received from a reproducing head of the digital video tape device;

servo means for producing a head switching pulse and a super-video home system (S-VHS)/video home system (VHS) discriminating signal;

identification detecting means for producing a signal indicative of an end of reading one segment of tracks; and sync signal detecting means, responsive to the serial data, the serial clock signal, the head switching pulse, the S-VHS/VHS discriminating signal, and the signal indicative of the end of the reading of one segment of tracks, for determining correspondence in sync patterns even in a case where not all corresponding bits coincide with one another, for removing erroneously detected sync patterns using a window situated around a position at which a sync signal is produced, for detecting a signal, wherein the sync signal detecting means includes:

means for generating a signal indicating a reading of an initial portion of a track of recorded information in response to the head switching pulse, the S-VHS/VHS discriminating signal, and a first clock signal, clock converting means for producing first and second clock signals by using the serial clock signal and a matched block sync signal, means for generating and outputting the matched block sync signal to the clock converting means by using the serial data, the serial clock signal, and the first clock signal, and for detecting a block sync signal, and data aligning means for producing final data in response to a sync pattern by using the serial clock signal and the first and second clock signals.

3. An apparatus for a digital video tape device as claimed in claim 2, wherein the means for generating the signal indicating the reading of the initial portion of the track comprises:

an S-VHS discriminator for generating a signal indicating a reading of an initial portion of a given track by using the head switching pulse and the first clock signal, when reading every track in a super-video home system (S-VHS);

a VHS discriminator for generating a signal indicating a reading of an initial portion of a given track by using the head switching pulse and first clock signal, when every two tracks are read; and a track-initial portion recognition signal selector for selecting and producing one of the signals produced from the S-VHS discriminator and the VHS discriminator in response to the S-VHS/VHS discriminating signal.

4. An apparatus for a digital video tape device as claimed in claim 2, wherein the block sync signal detecting means comprises:

first pattern match detecting means for receiving serial data and a serial clock signal and for detecting most significant bit, 6 bits of data from an expected position of the data;

second pattern match detecting means for detecting bits, up to four bits maximum, other than the bits detected in the first pattern match detecting means, even if errors occur;

an AND gate for outputting a logical product of outputs produced from the first and second pattern match detecting means;

matched block sync signal detecting means for window-processing an output of the AND gate, and for producing a matched block sync signal;

BSYNC1 detecting means for converting the output of the AND gate into a block sync signal having a width of the first clock signal;

window processing means for defining a window by using the first clock signal, the segment-end signal, and the signal indicating the reading of the initial portion of a track, and for removing block sync signals erroneously detected in the AND gate; and final block sync signal detecting means for window-processing an output of the BSYNC1 detecting means with an output of the window processing means, and for removing the block sync signal erroneously detected in the AND gate, to produce a final block sync signal.

5. An apparatus for a digital video tape device as claimed in claim 4, wherein the window processing means comprises:

an I window processor for generating a window signal for detecting an initial block sync signal in a plurality of tracks, by using the signal indicating the reading of the initial portion of a track, an output signal of the BSYNC1 detecting means, and the first clock signal;

an N window processor for generating a window signal for causing a predefined window to open or close in response to counted values by using as a clear signal the block sync signal, the first clock signal, and the window signal of the I window processor; and a D window processor for generating a window signal for causing a predetermined window to open for a predetermined block duration upon receipt of the segment-end signal and for causing the window to close upon receipt of the block sync signal.

6. An apparatus for a digital video tape device as claimed in claim 2, wherein the clock converting means includes:

a first clock generator for producing a clock signal having a constant duty cycle, by using the serial clock signal; and a second clock generator for producing a clock signal having a duty cycle varying with receipt of the block sync signal, by using as a clear signal the matched block sync signal from the matched block sync signal detecting means.

7. An apparatus for a digital video tape device as claimed in claim 2, wherein the data aligning means includes:

first delay means for delaying the serial data N times by the serial clock to produce parallel data;

second delay means for receiving the parallel data output by the first delay means and for delaying the parallel data output by the first delay means by the second clock signal from the second clock generator; and third delay means for latching the output of the second delay means by the clock signal of the first clock generator, and for producing an output.

8. An apparatus for a digital video tape device for detecting a sync signal in digital data, comprising:

data restoring means for producing serial data and a serial clock signal received from a reproducing head of the digital video tape device;

servo means for producing a head switching pulse and a super-video home system (S-VHS)/video home system (VHS) discriminating signal;

identification detecting means for producing a signal indicative of an end of reading one segment of tracks; and sync signal detecting means including:

a track-initial portion recognition signal generating means for generating a signal indicative of an initial portion of the tracks, a window signal generating means for generating a window signal using a segment end signal from the identification detecting means and the signal indicative of the initial portion of the tracks, a block sync signal detecting means for detecting a block sync signal region provided from the data restoring means, and a sync signal processing means for processing a sync signal detected from a window signal region provided from the window signal generating means as if the sync signal is matched for the sync signal with an error of less than a preset number of bits.

9. The apparatus for a digital video tape device as claimed in claim 8, wherein the track-initial portion recognition signal generating means comprises:

an S-VHS discriminator for generating a signal indicating a reading of an initial portion of a given track by using the head switching pulse and the first clock signal, when reading every track in a super-video home system (S-VHS);

a VHS discrimination for generating a signal indicating a reading of an initial portion of a given track by using the head switching pulse and first clock signal, when every two tracks are read; and a track-initial portion recognition signal selector for selecting and producing one of the signals produced from the S-VHS discriminator and the VHS discriminator in response to the S-VHS/VHS discriminating signal.

10. The apparatus for a digital video tape device as claimed in claim 8, wherein the block sync signal detecting means comprises:

first pattern match detecting means for receiving serial data and a serial clock signal and for detecting most significant bit, 6 bits of data from an expected position of the data;

second pattern match detecting means for detecting bits, up to four bits maximum, other than the bits detected in the first pattern match detecting means, even if errors occur;

an AND gate for outputting a logical product of outputs produced from the first and second pattern match detecting means;

matched block sync signal detecting means for window-processing an output of the AND gate, and for producing a matched block sync signal;

BSYNC1 detecting means for converting the output of the AND gate into a block sync signal having a width of the first clock signal;

window processing means for defining a window by using the first clock signal, the segment-end signal, and the signal indicating the reading of the initial portion of a track, and for removing block sync signal erroneously detected in the AND gate, and final block sync signal detecting means for window-processing an output of the BSYNC1 detecting means with an output of the window processing means, and for removing the block sync signal erroneously detected in the AND gate, to produce a final block sync signal.

11. The apparatus for a digital video tape device as claimed in claim 8, wherein the window signal generating means comprises:

an I window processor for generating a window signal for detecting an initial block sync signal in a plurality of tracks, by using the signal indicating the reading of the initial portion of a track, an output signal of the BSYNC1 detecting means, and the first clock signal;

an N window processor for generating a window signal for causing a predefined widow to open or close in response to counted values by using as a clear signal the block sync signal, the first clock signal, and the window signal of the I window processor; and a D window processor for generating a window signal for causing a predetermined window to open for a predetermined block duration upon receipt of the segment-end signal and for causing the window to close upon receipt of the block syn signal.

*12. An apparatus for detecting a sync signal in digital data in a digital recording device comprising:*

*data restoring means for producing serial data and a serial clock signal received from a reproducing head of the digital recording device;*

*a signal generator for producing an initializing signal corresponding to a segment start in the digital data;*

*a detector for detecting a format of a reproducing operation of the digital data;*

*identification detecting means for producing a signal indicative of an end of reading one segment of tracks; and*

*sync signal detecting means, responsive to the serial data, the serial clock signal, the initializing signal, the format of the reproducing operation, and the signal indicative of the end of the reading of one segment of tracks, for determining correspondence in sync patterns even in a case where not all corresponding bits coincide with one another, for removing erroneously*

*detected sync patterns using a window situated around a position at which a sync signal is produced, and for detecting a sync signal, wherein the sync signal produces a segment start signal using the initializing signal, the segment start signal being received by the identification detecting means.*

*13. The apparatus according to claim 12, wherein the initializing signal includes a head switching pulse.*

*14. The apparatus according to claim 12, wherein the one segment of tracks includes a video data.*

*15. An apparatus for detecting a sync signal in digital data in a digital recording device comprising:*

*data restoring unit producing serial data and a serial clock signal received from a reproducing head of the digital recording device;*

*a signal generator for producing an initializing signal corresponding to a segment start of the digital data;*

*a detector for detecting a format of a reproducing operation of the digital data;*

*an indicator producing a signal indicative of an end of reading one segment of tracks; and*

*sync signal detector, responsive to the serial data, the serial clock signal, the initializing signal, the format of the reproducing operation, and the signal indicative of the end of the reading of one segment of tracks, determining correspondence in sync patterns even in a case where not all corresponding bits coincide with one another, for removing erroneously detected sync patterns using a window situated around a position at which a sync signal is produced, and for detecting a sync signal,*

*wherein the sync signal produces a segment start signal using the initializing signal, the segment start signal being received by the indicator.*

*16. The apparatus according to claim 15, wherein the initializing signal includes a head switching pulse.*

*17. The apparatus according to claim 15, wherein the one segment of tracks includes a video data.*

*18. A method for detecting a sync signal in digital data in a digital recording device comprising:*

*producing serial data and a serial clock signal received from a reproducing head of the digital recording device;*

*generating an initializing signal corresponding to a segment start, the initializing signal being used to produce a segment start signal;*

*detecting a format of a reproducing operation;*

*producing a signal indicative of an end of reading one segment of tracks; and*

*determining correspondence in sync patterns even in a case where not all corresponding bits coincide with one another, removing erroneously detected sync patterns using a window situated around a position at which a sync signal is produced, and detecting a sync signal, responsive to the serial data, the serial clock signal, the initializing signal, the format of the producing operation, and the signal indicative of the end of the reading of one segment of tracks.*

*19. A method for detecting a sync signal in digital data in a digital recording device comprising:*

*producing serial data and a serial clock signal received from a reproducing head of the digital recording device;*

*generating an initializing signal corresponding to a segment start, the initializing signal being used to produce a segment start signal;*

*detecting a format of a reproducing operation;*

*producing a signal indicative of an end of reading one segment of tracks; and*

*responsive to the serial data, the serial clock signal, the initializing signal, the format of the reproducing operation, and the signal indicative of the end of the reading of one segment of tracks, determining correspondence in sync patterns even in a case where not all corresponding bits coincide with one another, removing erroneously detected sync patterns using a window situated around a position at which a sync signal is produced, and detecting a sync signal.*

*20. A method for detecting a sync signal in digital data for a digital video tape device, the method comprising the steps of:*

*producing serial data and a serial clock signal received from a reproducing head of the digital video tape device;*

*producing a head switching pulse and a super-video home system (S-VHS)/video home system (VHS) discriminating signal;*

*producing a signal indicative of an end of reading one segment of tracks; and*

*determining, in response to the serial data, the serial clock signal, the head switching pulse, the S-VHS/VHS discriminating signal, and the signal indicative of the end of the reading of one segment of tracks, correspondence in sync patterns even in a case where not all corresponding bits coincide with one another, for removing erroneously detected sync patterns using a window situated around a position at which a sync signal is produced, and for detecting a sync signal.*

*21. The method according to claim 20, wherein the step of determining correspondence in sync patterns includes the steps of:*

*generating a signal indicating a reading of an initial portion of a track of recorded information in response to the head switching pulse, the S-VHS/VHS discriminating signal, and a first clock signal;*

*producing first and second clock signals by using the serial clock signal and a matched block sync signal;*

*outputting the matched block sync signal to the clock converting means by using the serial data, the serial clock signal, and the first clock signal, and for detecting a block sync signal; and*

*producing final data in response to a sync pattern by using the serial clock and the first and second clock signals.*

*22. The method according to claim 21, wherein the step of generating a signal indicating a reading of an initial portion of a track includes the steps of:*

*generating from an S-VHS discriminator a signal indicating a reading of an initial portion of a given track by using the head switching pulse and the first clock signal, when reading every track in a super-video home system;*

*generating from a VHS discriminator a signal indicating a reading of an initial portion of a given track by using the head switching pulse and first clock signal, when reading every two tracks are read; and*

*selecting and producing one of the signals produced from the V-VHS discriminator and the VHS discriminator in response to the S-VHS/VHS discriminating signal.*

*23. The method according to claim 21, wherein the step of detecting the block sync signal includes the steps of:*

*receiving serial data and a serial clock signal;*

*detecting, in response to the receiving step, a most significant bit, 6 bits of data from an expected position of the data and outputting a first output signal;*

*detecting bits, up to four bits maximum, other than the bits detected in the step of detecting the most significant bit, even if errors occur, and outputting a second output signal;*

*outputting a logical product of the first and second output signals as a third output signal;*

*window-processing the third output signal and producing a matched block sync signal;*

*converting the third output signal into a block sync signal having a width of the first clock signal and outputting a fourth output signal;*

*defining a window by using the first clock signal, the segment-end signal, and the signal indicating the reading of the initial portion of a track, and removing block sync signals erroneously detected in the step of outputting the logical product, the defining step producing a fifth output signal; and*

*window-processing the fourth output signal with the fifth output signal and removing the block sync signal erroneously detected in the step of outputting the logical product to produce a final block sync signal.*

*24. The method according to claim 23, wherein the step of defining a window includes the steps of:*

*generating a first window signal to detect an initial block sync signal in a plurality of tracks, by using the signal indicating the reading of the initial portion of a track, the fourth output signal of the converting step, and the first clock signal;*

*generating a second window signal to cause a predefined window to open or close in response to counted values by using as a clear signal the block sync signal, the first clock signal, and the first window signal; and*

*generating a third window signal to cause a predetermined window to open for predetermined block duration upon receipt of the segmented-end signal for causing the window to close upon receipt of the block sync signal.*

*25. The method according to claim 21, wherein the step of producing first and second clock signals includes the steps of:*

*producing a clock signal having a constant duty cycle, by using the serial clock signal; and*

*producing a clock signal having a duty cycle varying with receipt of the block sync signal, by using as a clear signal the matched block sync signal.*

*26. The method according to claim 21, wherein the step of producing final data includes the steps of:*

*delaying the serial data N times by the serial clock to produce parallel data;*

*delaying the parallel data by the second clock signal and producing a delayed parallel data; and*

*latching the delayed parallel data by the clock signal and producing an output.*

*27. The method according to claim 20, wherein the step of determining correspondence in sync patterns comprises the steps of:*

*generating a signal indicative of an initial portion of the tracks;*

*generating a window signal using the signal indicative of the end of reading one segment of tracks and the signal indicative of the initial portion of the tracks;*

*detecting a block sync signal region in response to the step of producing serial data and serial clock signals; and*

*processing a sync signal detected from a window signal region provided from the step of generating the window signal as if the sync signal is matched for the sync signal with an error or less than a preset number of bits.*

*28. The method according to claim 27, wherein the step of generating a signal indicative of an initial portion of the tracks includes the steps of:*

*generating from an S-VHS discriminator a signal indicating a reading of an initial portion of a given track by using the head switching pulse and the first clock signal, when reading every track in a super-video home system;*

*generating from a VHS discriminator a signal indicating a reading of an initial portion of a given track by using the head switching pulse and first clock signal, when reading every two tracks are read; and*

*selecting and producing one of the signals produced from the S-VHS discriminator and the VHS discriminator in response to the S-VHS/VHS discriminating signal.*

*29. The method according to claim 27, wherein the step of detecting the block sync signal includes the steps of:*

*receiving serial data and a serial clock signal;*

*detecting, in response to the receiving step, a most significant bit, 6 bits of data from an expected position of the data and outputting a first output signal;*

*detecting bits, up to four bits maximum, other than the bits detected in the step of detecting the most significant bit, even if errors occur, and outputting a second output signal;*

*outputting a logical product of the first and second output signals as a third output signal;*

*window-processing the third output signal and producing a matched block sync signal;*

*converting the third output signal into a block sync signal having a width of the first clock signal and outputting a fourth output signal;*

*defining a window by using the first clock signal, the segment-end signal, and the signal indicating the reading of the initial portion of a track, and removing block sync signals erroneously detected in the step of outputting the logical product, the defining step producing a fifth output signal; and*

*window-processing the fourth output signal with the fifth output signal and removing the block sync signal erroneously detected in the step of outputting the logical product to produce a final block sync signal.*

*30. The method according to claim 27, wherein the step of defining a window includes the steps of: generating a first window signal to detect an initial block sync signal in a plurality of tracks, by using the signal indicating the reading of the initial portion of a track, the fourth output signal of the converting step, and the first clock signal;*

*generating a second window signal to cause a predefined window to open or close in response to counted values by using as a clear signal the block sync signal, the first clock signal, and the first window signal; and*

*generating a third window signal to cause a predetermined window to open for predetermined block duration upon receipt of the segmented-end signal and for causing the window to close upon receipt of the block sync signal.*

* * * * *

UNITED STATES PATENT AND TRADEMARK OFFICE

CERTIFICATE OF CORRECTION

PATENT NO. : RE 37,904 E
DATED : November 12, 2002
INVENTOR(S) : Doo H. Lee

It is certified that error appears in the above-identified patent and that said Letters Patent is hereby corrected as shown below:

Title page,
Item [73], delete "LG.Phillips LCD Co., Ltd." and insert -- LG Electronics Inc. --.

Signed and Sealed this

Seventeenth Day of June, 2003

JAMES E. ROGAN
*Director of the United States Patent and Trademark Office*